July 14, 1953 — C. E. KERR — 2,645,401
FILLING VALVE WITH HEAD SPACE PROVIDING MEANS
Filed June 10, 1946 — 3 Sheets-Sheet 1
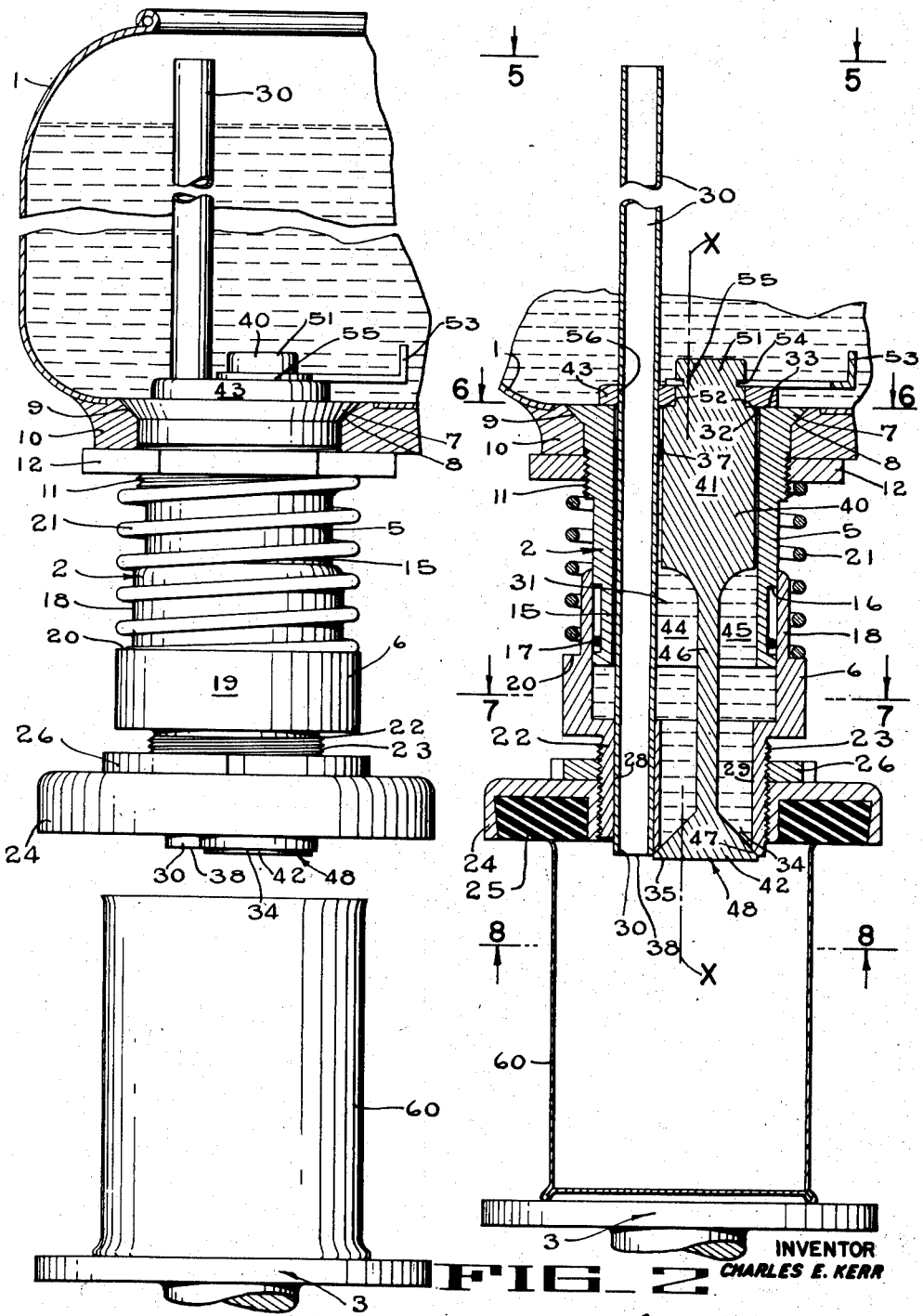
INVENTOR
CHARLES E. KERR
BY Philip A. Minnis
Hans G. Hoffmeister
ATTORNEYS

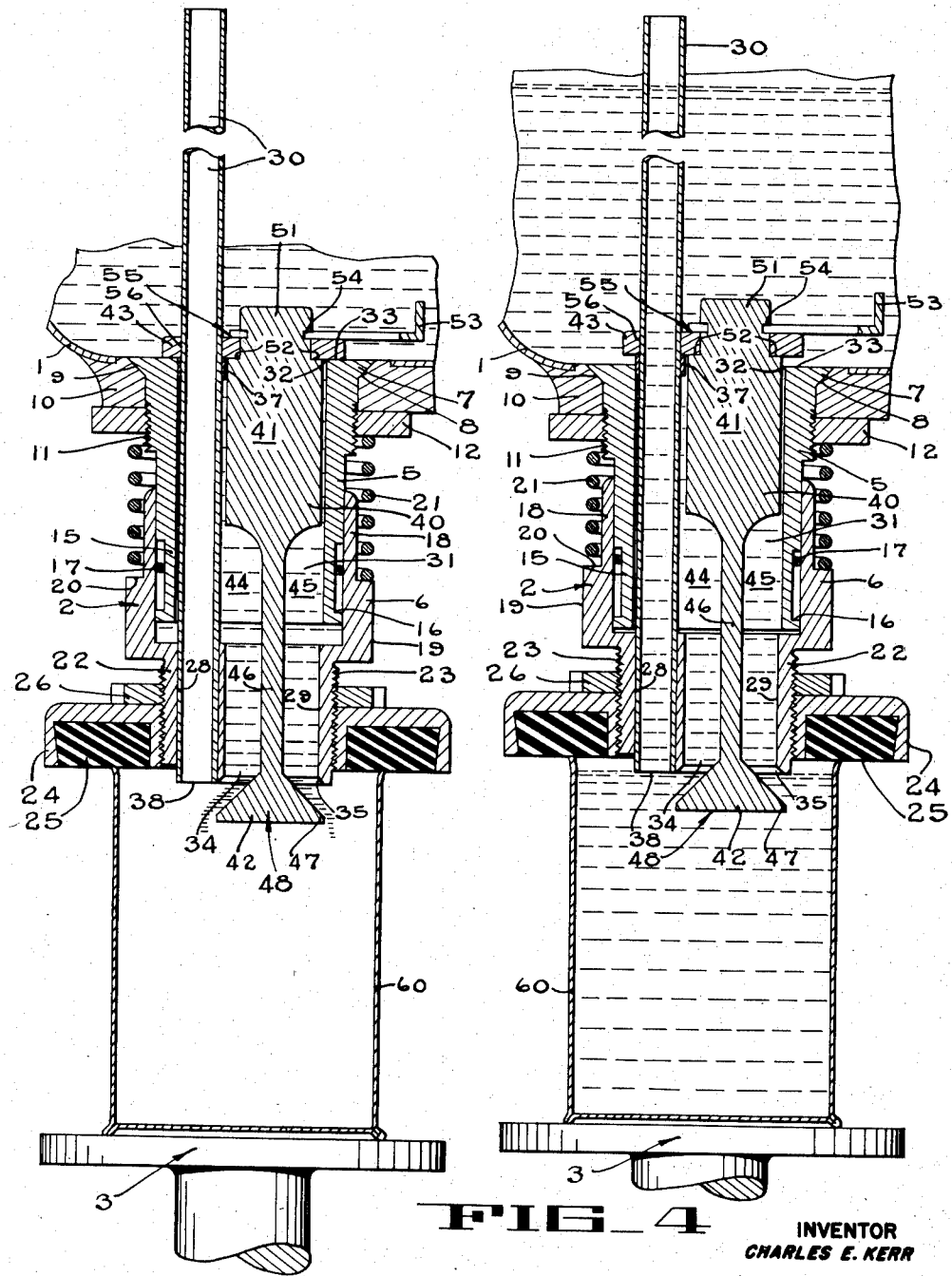

July 14, 1953  C. E. KERR  2,645,401
FILLING VALVE WITH HEAD SPACE PROVIDING MEANS
Filed June 10, 1946  3 Sheets-Sheet 3
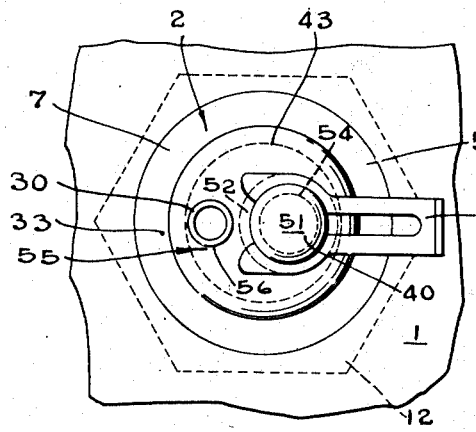
FIG_5
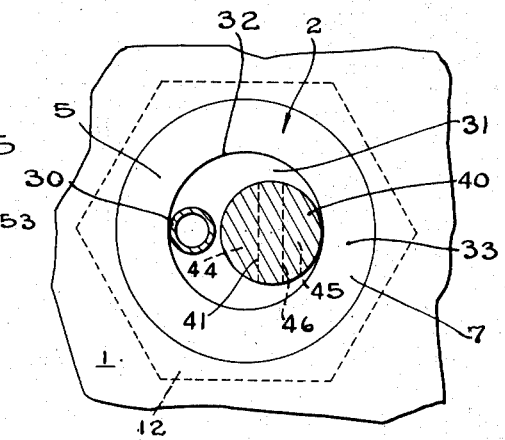
FIG_6
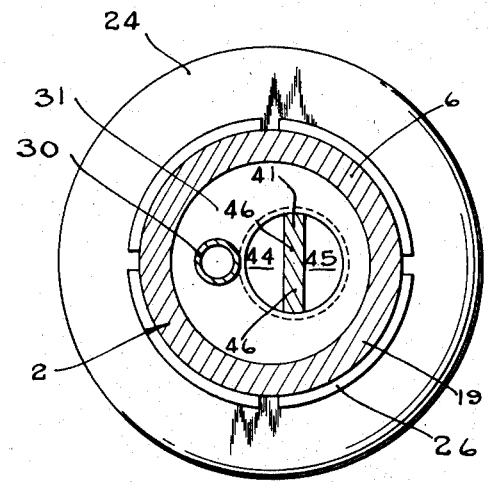
FIG_7
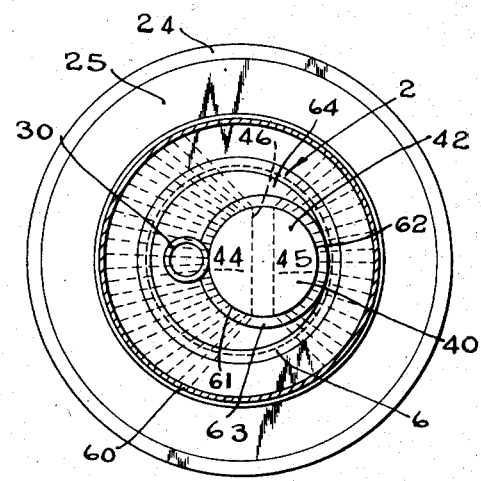
FIG_8
INVENTOR
CHARLES E. KERR
BY
ATTORNEYS Patented July 14, 1953

2,645,401

UNITED STATES PATENT OFFICE 2,645,401

FILLING VALVE WITH HEAD SPACE PROVIDING MEANS

Charles E. Kerr, San Jose, Calif., assignor to Food Machinery and Chemical Corporation, San Jose, Calif., a corporation of Delaware Application June 10, 1946, Serial No. 675,621

16 Claims. (Cl. 226—124)

The present invention appertains to liquid filling machines.

More particularly the present invention relates to an improved filling valve for filling liquid into large mouth containers, such as cans, glass jars, or the like, which is especially suitable for handling fruit or vegetable juices which are subject to excessive foaming during rapid filling of the containers.

One object of the present invention is to provide an improved filling valve for liquid filling machines which is capable of attaining extremely high speeds in filling.

Another object is to provide a high speed filling valve which permits uniform and accurate filling of the containers.

Another object is to provide a filling valve which will stop instantly the feed of the liquid when the desired filling level is reached.

Another object is to provide a filling valve which can be quickly adjusted to vary the filling level.

Another object is to provide a filling valve wherein the discharge of liquid from the vent tube into the container and dripping of liquid into the container after the latter has been disengaged from the valve have been eliminated.

Another object is to provide a filling valve wherein the admittance of the liquid from the supply tank to the valve chamber is controlled independently of the discharge of the liquid from the valve chamber into the container.

Another object is to provide a filling valve which reduces foaming of the liquid in the containers as well as in the liquid supply tank of the filling machine.

Another object is to provide an inexpensive high speed filling valve of simple construction which can be readily removed from the filling machine for cleaning.

Other and further objects and advantages of the present invention will become apparent from the following description and drawings in which:

Fig. 1 illustrates a portion of a filling machine in conjunction with the filling valve of the present invention, the valve being shown in side elevation, while certain parts of the filling machine are shown in section and a container to be filled is illustrated in its lowermost position.

Fig. 2 is a longitudinal section through the filling valve shown in Fig. 1, the container being illustrated in elevated position in engagement with the sealing gasket of the lift plate of the valve and the valve being shown in its closed position prior to the commencement of the filling operation.

Fig. 3 is a view similar to Fig. 2 with the outlet valve disposed in open and the inlet valve disposed in closed position.

Fig. 4 is a view similar to Fig. 3 with the inlet and outlet valves disposed in open position and illustrating the filling operation of the valve.

Fig. 5 is a plan view of the filling valve shown in Fig. 2 taken along line 5—5 thereof.

Fig. 6 is a section taken along line 6—6 of Fig. 2.

Fig. 7 is a transverse section of the filling valve shown in Fig. 2 taken along line 7—7 thereof.

Fig. 8 is a bottom view of the valve shown in Fig. 2 taken along line 8—8 thereof, the outlet valve being shown in open position with liquid discharging therefrom.

Referring now to the drawings and especially Figs. 1 to 4 thereof, the filling machine partially illustrated therein is of the general type disclosed in Patent No. 1,355,015 to A. R. Thompson, dated October 5, 1920 and comprises a supply tank 1, a filling valve 2, and a vertically movable container table or support 3 disposed beneath the filling valve in vertical alignment therewith.

It is to be understood that a plurality of filling valves 2 are arranged in spaced relation on the tank 1 adjacent the periphery thereof and that an equal number of container supports are employed in connection therewith, as well known in the art. However, since all of these valves and supports are of identical construction and operate in the same manner only one filling valve and container support have been illustrated and described herein.

The filling valve 2 comprises an upper tubular valve body 5 and a lower tubular valve body 6 telescoping therewith. The upper valve body 5 is provided at its upper end with a flange 7 having a tapered annular sealing surface 8 which fits snugly into a complementary tapered aperture 9 of the bottom wall 10 of the tank 1. The portion 11 of the upper valve body 5 adjacent the lower surface of the bottom wall 10 is threaded to receive a hexagonal lock nut 12 whereby the upper body member 5 is rigidly secured to the bottom 10 of the tank in liquid tight sealing engagement therewith. The lower portion 15 of the valve body 5 below the threaded portion 11 thereof is of somewhat reduced diameter and is provided with an annular recess 16 adjacent the lower end thereof.

The valve body 6 is telescoped upon the reduced portion 15 of the upper body member 5 and a liquid tight seal is established therebetween by means of a rolling ring seal 17 compressed between the two valve members 5 and 6 within the annular recess 16. The uppermost portion 18 of the body member 6 is of approximately the same diameter as the threaded portion 11 of the upper valve body while the center portion 19 of the member 6 is of a larger diameter to provide an annular shoulder 20. Disposed between the shoulder 20 of the member 6 and the nut 12 of the member 5 is a coil spring 21. The lowermost portion 22 of the member 6 is of reduced diameter and exteriorly threaded, as shown at 23. Threaded upon the portion 22 is a vertically adjustable lift plate 24 within which a resilient sealing ring or gasket 25 is mounted on the lower side thereof. The lift plate 24 is locked in adjusted position on the portion 22 of the member 6 by means of a lock nut 26.

The lowermost portion 22 of the member 6 is provided with two cylindrical vertical bores 28 and 29 having their centers on opposite sides of the central vertical axis X—X (Fig. 2) of the valve. Press fitted within the small bore 28 is a vent tube 30 which extends vertically upward through the body members 5 and 6 into the tank 1 of the filling machine to a point above the liquid level therein (Fig. 1).

The space within the filling valve body or casing defined by the two tubular members 5 and 6 constitutes an expansible valve chamber 31. The upper end of the tubular member 5 establishes an inlet 32 for admitting liquid from the tank 1 to the valve chamber 31, and disposed adjacent the same is a flat valve seat 33. The open ended bore 29 of the lower member 6 forms an outlet 34 for discharging the liquid from the valve chamber 31 into the container to be filled. The lowermost end of the portion 22 of the body member 6 is provided with a frusto-conical valve seat 35 adjacent the outlet 34 thereof. Fixed to the tube 30 and disposed within the chamber 31 a short distance below the top of the upper member 5 is a collar 37. The vent tube 30 is provided with a discharge port 38 at the lowermost end thereof which is disposed at the same level as the outlet port 34 of the body member 6.

In order to control the flow of the liquid through the filling valve chamber 31, a duplex valve 40 is employed which comprises a heavy stem 41 provided with an outlet valve head 42 and an inlet valve head 43. The lower head 42 and the valve stem 41 are formed as an integral part and the valve stem is provided with two vertically disposed longitudinally extending channels 44 and 45 separated by a central web 46 extending diametrically within the bore 29 and thereby serving as a guide for the duplex valve 40 during vertical movement of the same within the valve housing. The valve head 42 is provided with a tapered sealing surface 47 adapted to seat within the tapered valve seat 35 in liquid tight engagement therewith. The valve head 42 and valve seat 35 form an outlet valve 48 for controlling the discharge of liquid from the chamber 31.

The upper end of the valve stem 41 is of reduced diameter, as shown at 51, to provide a shoulder 52 and disposed upon the neck 51 and locked against the shoulder 52, by means of a bifurcated key 53 (Fig. 5) received in a key way 54, is the upper valve head 43, previously referred to. This upper valve head is adapted to seat in liquid tight engagement with the flat valve seat 33 and forms an inlet valve 55 therewith for controlling the admittance of liquid from the tank 1 through inlet port 32 into the chamber 31. The valve head 43 is provided with a circular opening 56 within which the vent tube 30 is slidably received.

The upper and lower body members 5 and 6 are normally held in extended position under the action of the coil spring 21, as shown in Fig. 2, so that the inlet and outlet valves 48 and 55 are in closed position, i. e., the lower and upper valve heads 42 and 43 are seated on their seats 35 and 33, respectively, which form integral parts of the members 6 and 5, respectively.

When the lift plate 24 and the lower body member 6 are raised against the tension of the coil spring 21, the member 6 is telescoped upon the member 5, the chamber 31 is contracted and the valve seat 35 is withdrawn from its engagement with the valve head 42 (Fig. 3) because the weight of the valve stem 41 holds the duplex valve 40 in its lowermost position so that the discharge or outlet valve 48 is opened while the inlet valve 55 remains in closed position preventing entry of liquid from the tank into the chamber 31 of the filling valve. As the lift plate 24 is raised further, and while the outlet valve 48 remains in open position, the collar 37 of the vent tube 30 engages the upper valve head 43 and lifts the same from its seat 33 whereby the inlet valve 55 is opened and the liquid is admitted from the tank 1 into the chamber 31 of the filling valve and is discharged therefrom through the outlet valve 48. While the valve head 43 is lifted the valve stem 41, valve head 42 are lifted therewith, however, the outlet valve 48 remains fully open since the body member 6 is lifted at the same rate and simultaneously with the valve stem 41. Conversely, when the lift plate 24 and body member 6 are subsequently lowered, the upper valve head 43, valve stem 41, and lower valve head 42 follow the collar 37 downward until the valve head 43 is seated upon the valve seat 33 and whereby further downward movement of the valve stem 41 and valve head 42 is arrested the inlet valve 55 is closed while the outlet valve 48 remains open. During the downward movement of the lift plate 24, the members 5 and 6 are telescoped away from each other under the action of the coil spring 21 whereby the valve chamber 31 is expanded and, after the inlet port 32 has been closed, suction is created at the outlet port 34. The continuing downward movement of the lift plate 24 and body member 6, as well as the vent tube 30 while the valve stem 41 and valve head 42 remain in their lowermost position (Fig. 4) is finally arrested upon sealing engagement of the seat 35 of the member 6 with the lower valve head 42 under the force of the coil spring 21 (Fig. 2).

In the operation of the filling machine the tank 1, valve 2, and table 3 are continuously rotated about the vertical axis of the machine. The cans or containers to be filled are successively fed to the container holder and, as soon as a container is received thereon, the support 3 is gradually and continuously raised from the position shown in Fig. 1 to the position shown in Fig. 4. During the upward movement of the container 60 from the position shown in Fig. 1 to the position illustrated in Fig. 2, the mouth rim thereof is tightly pressed against the sealing gasket 25 of the lift plate 24 so that a liquid tight seal between the container 60 and gasket 25 is established.

While the container is elevated in this manner and brought into liquid tight engagement with the gasket 25, both control valves, i. e., the inlet valve 55 as well as the outlet valve 48, are in closed position. As the upward movement of the container 60 continues from the position shown in Fig. 2 to the position illustrated in Fig.

3, the lift plate 24, body member 6, and vent tube 30 are elevated thereby against the pressure of the coil spring 21 and the body member 6 is telescoped upon the stationary tubular member 5. During the elevation of the tubular member 6 from the position shown in Fig. 2 to the position shown in Fig. 3, the valve seat 35 is disengaged from the valve head 42 whereby the outlet valve 48 is opened and the chamber 31 is contracted while the inlet valve 55 remains in closed position.

During the first cycle of operation of each filling valve 2 of the filling machine, the chamber 31 thereof is empty and, therefore, no liquid is discharged from the outlet valve 48. However, during subsequent operations of each filling valve, the chamber 31 thereof is filled with liquid and, consequently, upon opening of the valve 48 and contraction of the chamber 31 in the manner as above described, some liquid will be discharged from the chamber 31 into the container 60 due to the contraction of the chamber 31. Usually no gravity flow of the liquid from the chamber 31 takes place until the inlet valve 55 opens because the period between the opening of the valves 48 and 55 is very brief.

During further upward movement of the lift plate 24, the member 6, and the vent tube 30, from the position shown in Fig. 3 to the position shown in Fig. 4, the collar 37 of the vent tube engages the lower surface of the upper valve head 43 whereby the same is lifted from its seat 33 so that the inlet valve 55 is opened and communication between the liquid in the tank 1 and the valve chamber 31 is established. As soon as the inlet valve 55 is opened, liquid flows from the tank 1 through the inlet port 32 into the chamber 31 and discharges by gravity therefrom through the outlet port 34 and valve 48 into the container 60. The valve head 43 is lifted only a short distance so that the area of the liquid inlet passage of the inlet valve 55 is smaller than the area of the outlet port 34 whereby the speed of flow of the liquid from the chamber 31 into the container 60 is reduced or dampened so that the flow of liquid from the outlet valve 48 is less violent and foaming of the liquid is reduced to a minimum. The amount of opening of the inlet valve 55 however may be varied as desired by lowering or raising the tank 1 and filling valve 2 as a unit relative to the holder 3 in a manner well known in the art.

The downwardly flowing liquid is deflected by the tapered or frusto-conical surface 47 of the valve head 42 toward the side wall of the container 60 and, since the path of flow of the liquid discharging from the tank 1 into the container is divided by the central web 46, the liquid is discharged in two separate fan shaped streams or sprays 61 and 62 (Fig. 8), which are separated by two free air spaces 63 and 64 at opposite sides thereof and in line with the diameter passing through the central web 46. It is, therefore, apparent that in the filling operation of the valve foaming of the liquid which enters the container 60 is reduced by three factors; namely, the reduction of the speed of liquid at the point of entry into the container, the deflection of the liquid against the side wall of the container to prevent splashing, and the release of the air within the container beneath the inflowing streams of liquid through the two free air spaces 63 and 64 and the vent tube 30 instead of through the streams of liquid.

While both valves 42 and 43 are disposed in open position the liquid flows rapidly from the tank 1 through the filling valve 2 into the container 60 while the air is freely vented from the latter through the vent tube 30. The rapid flow of the liquid into the container 60 continues until the desired filling level is reached, i. e., the liquid in the container reaches the lower end 38 of the vent tube 30, which is disposed at the same elevation as the outlet 34 of the member 6. While the liquid level in the container remains at the level of the lower end of the vent tube 30, the liquid rises now in the vent tube 30 up to the level of the liquid in the tank whereupon further flow of the liquid is arrested (Fig. 4). Thereupon the container support 3 and the container 60 supported thereby are lowered during the continuing cycle of operation of the filling machine whereby the lift plate 24, the member 6, and vent tube 30 are likewise lowered under the action of the coil spring 21 and the body members 5 and 6 telescope away from each other effecting expansion of the valve chamber 31. While the body member 6 and vent tube 30 are lowered, the entire duplex valve 40 is lowered therewith until the valve head 43 engages the valve seat 33 of the tubular member 5 whereby the inlet valve 55 is closed and the communication between the chamber 31 and the tank 1 is interrupted.

As soon as the valve 55 has been closed and while the outlet valve 48 remains in open position and the member 6 and vent tube 30 continue their downward movement, a suction is created by the expansion of the chamber 31 whereby the liquid from the vent tube 30 is drawn back into the container 60 and upwardly into the expanding chamber 31. This chamber is so dimensioned that its increase in volume subsequently to the closing of the inlet valve 55 at least is equal to the volume of the liquid within the vent tube 30. If the increase in volume of the chamber 31 is in excess of the volume of the liquid in the vent tube 30, some air will enter the valve chamber 31, but bubbling of this air upward into the tank 1 is prevented because of the prior closure of the inlet valve 55.

During the continued downward movement of the member 6 and the vent tube 30, the valve seat 35 of the member 6 finally engages the lower valve head 42 and seats in liquid tight manner thereon so that the outlet valve 48 is now closed and all of the parts of the filling valve 2 are again in the position as shown in Fig. 2. It is to be noted, however, that upon closing of the valve 48 in the manner as above described, all of the liquid has been withdrawn from the vent tube 30 into the chamber 31 and is sealed therein. While the container 60 is now lowered to its lowermost position by the container support 3 and while the upper and lower valves 55 and 48, respectively, are in closed position, the container is disengaged from the gasket 25 of the lift plate 24, as shown in Fig. 1. The seal of the container with the gasket 25 is, therefore, broken and the filled container is now discharged from the machine and as soon as a new container has been fed to the support 3 the next cycle of the machine commences and is carried out in the same manner as described in the above.

From the above it will, therefore, be noted that since the outlet port of the outlet valve 48 is disposed at the same elevation as the lower end of the vent tube 30, the container is rapidly filled to the desired level, and there is no slowing down of the speed of filling toward the end of the filling period as in many conventional valves. Therefore, although in view of the reduced area of the liquid passage in the upper tubular member 5 the speed of flow of the liquid from the outlet port of valve 48 is less violent than the speed of flow of the liquid during the first part of the filling operation in conventional valves heretofore employed, the overall filling time of the present valve is considerably reduced so that the filling machine may be operated at a considerably higher speed than has heretofore been possible. Furthermore, since all of the liquid is drawn from the vent tub 30 back into the chamber 31 and the outlet valve 48 is closed before the container is disengaged from sealing engagement with the gasket 25, any dripping of the filling valve is positively prevented.

Due to the suction action of the valve, the liquid filling level in the container is always accurately maintained irrespective of any variations of the liquid level in the supply tank of the filling machine.

If it is desired to vary the level of fill in the container, the lock nut 26 is loosened and the lift plate 24 is screwed up or down on the threaded portion of the body member 6 whereby the position of the lower end of the vent tube 30 and body member 6 with respect to the lift plate 24 and gasket 25 is changed so as to project more or less into the container during the filling operation. After completion of the adjustment of the lift plate 24 the lock nut 26 is again tightened so as to firmly lock the lift plate in its adjusted position.

The filling valve may be easily disassembled and removed from the tank for cleaning by removing the key 53.

While I have shown and described a preferred embodiment of the present invention, it will be understood that various changes may be made without departing from the spirit of the invention and the scope of the appended claims.

Having thus described my invention, what I claim as new and desire to protect by Letters Patent is:

1. Apparatus for filling a container with liquid from a reservoir comprising a housing including relatively movable sections forming a chamber therewithin, an inlet valve associated with said housing intermediate said chamber and reservoir, an outlet valve associated with said housing intermediate said chamber and the container to be filled, and an air vent tube secured to one of said sections including means operable for effecting sequential operation of said valves upon relative movement of said sections to thereby control the admittance of liquid from the reservoir to the container through said chamber.

2. Apparatus for filling a container with liquid from a reservoir comprising a housing including relatively movable sections forming a chamber therewithin and having an inlet and outlet for simultaneously admitting the liquid from the reservoir into said chamber and for discharging the liquid from the chamber into the container to be filled, respectively, means cooperating with said inlet and outlet for sequentially opening and closing the same upon relative movement of said sections to thereby control the admittance of the liquid from the reservoir to the container, and tube means for venting the container during filling thereof, said tube means being attached to one of said sections and bodily movable therewith.

3. Apparatus for filling a container with liquid from a reservoir comprising a housing including relatively movable sections forming a chamber therewithin and having an inlet and outlet for admitting the liquid from the reservoir into said chamber and for discharging the liquid from the chamber into a container sealed to said housing, means cooperating with said inlet and outlet for sequentially opening and closing the same upon relative movement of said sections to thereby control the admittance of the liquid from the reservoir to the container, and a vent tube secured to one of said movable sections for bodily movement therewith and for venting the container during filling thereof, said opening and closing means being so arranged as to open the outlet in excess of said inlet whereby the speed of flow of the liquid from the chamber into the container is reduced to minimize foaming of the liquid in the container.

4. A valve for filling containers with liquid from a reservoir comprising a valve housing including relatively movable valve bodies forming an expansible chamber therewithin, a sealing member on one of said bodies for sealing the container to said chamber, a vent tube associated with said seal and extending above the liquid level in the reservoir for venting the container, an inlet valve associated with said housing intermediate said chamber and reservoir, an outlet valve associated with said housing intermediate said chamber and the container to be filled, and means for operating said valves sequentially and for expanding said chamber in timed relation therewith to thereby control the admittance of liquid from the reservoir through said chamber into the container to a predetermined level therein and to withdraw liquid entering said vent tube to thereby clear the same.

5. A valve for filling containers with liquid from a reservoir comprising a valve housing including telescoping valve bodies forming an expansible and contractable chamber therewithin, a seal on one of said telescoping bodies for sealing the container to said chamber, said seal being provided with a vent pipe extending above the liquid level in the reservoir for venting the container during filling thereof, one of said telescoping bodies being provided with an inlet intermediate the chamber and reservoir, the other of said telescoping bodies being provided with an outlet intermediate said chamber and the container to be filled, means for sequentially closing and opening said inlet and outlet upon contraction and expansion of said chamber incident to telescoping movement of the valve bodies to control the admittance of liquid from the reservoir through said chamber into the container to a predetermined level therein and to effect withdrawal of the liquid from the vent pipe during the expansion of the chamber prior to the unsealing of the container therefrom.

6. A valve for filling containers with liquid from a reservoir comprising means forming an expansible chamber having an inlet port for communication with said reservoir and a discharge port for communication with a container to be filled, a seal for engagement with the open end of a container to seal the container about said discharge port, a vent tube carried by said seal and disposed to communicate with the upper interior of a container positioned against said seal, said vent tube serving to provide for the escape of air from the container during the filling operation and to receive excess liquid delivered to the container, and a pair of valve closures for normally closing said inlet and discharge ports, respectively, said valve closures being operable sequentially during the contraction of said chamber to open said ports in such sequence that upon contraction of the chamber the discharge port is opened to establish communication between the chamber and the container before the inlet port is opened, and whereby upon expansion of said chamber the inlet port is closed in advance of the discharge port to effect withdrawal of the excess liquid from the vent tube by the expansion of the chamber prior to the closing of the discharge port.

7. A valve for filling containers with liquid from a reservoir comprising means forming an expansible chamber having an inlet port for communication with said reservoir and a discharge port for communication with a container to be filled, a seal for engagement with the open end of a container to seal the container about said discharge port, a vent tube disposed to communicate with the upper interior of a container positioned against said seal, said vent tube serving to provide for the escape of air from the container during the filling operation and to receive excess liquid delivered to the container, and a pair of valve closures normally closing said inlet and discharge ports, respectively, said valve closures being operable sequentially in response to contraction and expansion of said chamber to open and close said ports in such sequence that upon expansion of said chamber the inlet port is closed in advance of the discharge port to effect withdrawal of the excess liquid from the vent tube by the expansion of the chamber prior to the closing of the discharge port.

8. Apparatus for filling a container with liquid form a reservoir comprising relatively movable bodies forming an expansible chamber therewithin, said chamber having an inlet and an outlet to provide communication with said reservoir and a container to be filled, respectively, valves normally closing said inlet and outlet, sealing means carried by one of said valve bodies for sealing a container thereto, a tube carried by said sealing means for venting the container during filling thereof, means for elevating and lowering a container into and out of liquid tight sealing engagement with said sealing means so that upon elevation of the container one of said bodies is raised to contract said chamber to open both valves and to admit liquid from the reservoir into the container to the level of the vent tube therein and into said tube to the level of the liquid in the reservoir and upon lowering of the container said one body is lowered to close the inlet valve and expand said chamber to withdraw the liquid from the vent tube and to subsequently close the outlet valve prior to unsealing of the filled container from said sealing means.

9. A filling machine comprising a liquid supply tank, a filling valve connected to said tank, sealing means carried by said valve for sealing a container thereto, a tube carried by said valve for venting a container sealed thereto, means cooperating with said sealing means for sealing a container to said valve, means for opening said valve only when a container is sealed thereto whereby liquid flows from said tank into said sealed container and some into said tube, (means for drawing liquid out of said tube into said valve), and means for closing said valve after said tube has been emptied of liquid.

10. A valve mechanism for filling a container to a predetermined level with liquid from a liquid supply tank, comprising a valve body having telescoping upper and lower tubular valve body members defining an expansible valve chamber, said upper body member having an opening therein providing an inlet for the flow of liquid from said tank into said chamber, said lower body member having an opening therein to provide an outlet for the flow of liquid from said chamber into a container sealed thereto, a tube carried by said lower valve body for venting said container, a first valve associated with said inlet, a second valve associated with said outlet, means for telescoping said upper and lower body members for contracting said chamber and operating said valves so that said inlet and said outlet are opened and liquid is admitted from the tank into said container and said tube, means for closing said first valve and then expanding said chamber to create a vacuum so that the liquid in said tube is drawn back into the valve chamber, and means for closing said second valve after said vent tube is emptied.

11. Apparatus for filling a container to a predetermined level with liquid from a supply tank, comprising a valve body having relatively movable body members defining an expansible chamber, sealing means carried by one of said body members for sealing a container thereto, said valve chamber having an inlet to provide communication with said tank, a valve for closing said inlet, said valve chamber having an outlet at the lower end thereof to provide communication with said sealed container, a valve to close said outlet, a tube associated with said sealing means for venting a container sealed thereto and having a port not lower than said outlet, means for contacting a container with said sealing means and for raising the same to contract said chamber and to admit liquid from said tank through said chamber into said container whereby said container is filled to the level of the port of the tube and excess fluid flows into said tube, and a lost motion connection between said valves whereby upon lowering of said sealing means the inlet valve is closed and the chamber is expanded and the excess fluid is drawn from said tube through the container and said outlet into said chamber before said outlet valve is closed.

12. A filling valve comprising a valve body forming a valve chamber communicating with a valve outlet provided with a frustro-conical valve seat, a valve head adapted to mate with said valve seat, and a dividing wall connected with said valve head within said chamber for discharging liquid from said chamber through said outlet in a plurality of separate sprays upon unseating of said valve head from said seat.

13. A container filling mechanism associated with a liquid supply tank comprising a pair of relatively movable sleeves forming a chamber, one of said sleeves being fixed to the tank and the other of said sleeves having container covering means, a vent tube secured to one of said sleeves to vent the container while filling, a dual valve unit cooperating with said sleeves and having valving engagement with each sleeve respectively, said dual valve being rendered operative to open the sleeve chamber to the container under limited relative movement between said sleeves, and cooperative means interposed between said vent tube and said dual valve to cause the valve to open the sleeve chamber to said tank under further limited relative movement between said sleeves.

14. A container filling mechanism associated with a liquid supply tank comprising a pair of relatively movable sleeves forming a chamber, one of said sleeves being fixed to the tank and the other of said sleeves having container covering means, a vent tube secured to one of said sleeves to vent the container while filling, a dual valve unit cooperating with said sleeves and having valving engagement with each sleeve respectively, said dual valve being rendered operative to open the sleeve chamber to the container under limited relative movement between said sleeves, cooperative means interposed between said vent tube and said dual valve to cause the valve to open the sleeve chamber to said tank under further limited relative movement between said sleeves, and resilient means between said sleeves to normally urge the sleeves longitudinally apart to cause said dual valve to shut the tank and container ends of said sleeve chamber, said dual valve limiting such relative longitudinal movement between said sleeves under the action of said resilient means.

15. A container filling mechanism for a fluid supply tank comprising relatively movable sleeves connected with said tank and forming a chamber, one of said sleeves being adapted for fluid tight engagement with a container to be filled, a dual valve operable within said sleeves and having valving engagement with each of said sleeves, a tube carried by one of said sleeves and arranged to vent the container during filling, means on said dual valve arranged for slidable connection with said tube, one of said sleeves being adapted to cooperate with said dual valve to open the sleeve chamber to the container under limited relative movement between said sleeves, and actuating means on said tube for cooperative engagement with said dual valve to move the latter to open the sleeve chamber to the tank under further limited relative movement between said sleeves.

16. A container filling mechanism for a fluid supply tank comprising relatively movable sleeves connected with said tank and forming a chamber, one of said sleeves being adapted for fluid tight engagement with a container to be filled, a dual valve disposed in one position within said sleeves and operable for valving engagement with each of the sleeves, a tube carried by one of said sleeves and disposed in a second position within said sleeves to vent the container during filling, guide means on said dual valve adapted for slidable connection with said tube, one of said sleeves being adapted to cooperate with said dual valve to open the sleeve chamber to the container under limited relative movement between said sleeves, and actuating means on said tube for cooperative engagement with said dual valve to move the latter to open the sleeve chamber to the tank under further limited relative movement between said sleeves.

CHARLES E. KERR.

References Cited in the file of this patent

UNITED STATES PATENTS

| Number | Name | Date |
|---|---|---|
| 1,456,854 | McGhee et al. | May 29, 1923 |
| 1,554,805 | Fullips | Sept. 22, 1925 |
| 2,150,760 | Cozzoli | Mar. 14, 1939 |
| 2,325,419 | Minard | July 27, 1943 |

FOREIGN PATENTS

| Number | Country | Date |
|---|---|---|
| 198,507 | Great Britain | June 7, 1923 |